United States Patent [19]

Marsden et al.

[11] Patent Number: 5,029,145
[45] Date of Patent: Jul. 2, 1991

[54] METHODS OF GEOPHYSICAL EXPLORATION

[75] Inventors: David Marsden, London; David E. Overton, Middlesex, both of United Kingdom

[73] Assignee: Amoco Corporation, Chicago, Ill.

[21] Appl. No.: 530,039

[22] Filed: May 29, 1990

[51] Int. Cl.$^5$ .............................................. G01V 1/36
[52] U.S. Cl. ........................................ 367/56; 367/38; 367/52; 367/58
[58] Field of Search .................. 367/56, 58, 38, 52, 367/53

[56] References Cited

U.S. PATENT DOCUMENTS

| | | | |
|---|---|---|---|
| 3,838,390 | 9/1974 | Michon | 367/56 |
| 3,867,713 | 2/1975 | Tegland et al. | 367/56 |
| 4,001,770 | 1/1977 | Hofer | 367/56 |
| 4,048,612 | 9/1977 | Lawyer | 367/56 |
| 4,403,312 | 9/1983 | Thomeson | 367/56 |
| 4,677,598 | 6/1987 | Johnson | 367/56 |
| 4,933,912 | 6/1990 | Gallagher | 367/59 |

OTHER PUBLICATIONS

"Combining Techniques in Integrated 3D Land, Shallow Water, of Deep Channel Seismic Acquisition", Bukovics et al., First Break, vol. 8, #10, 10/90.

*Primary Examiner*—Ian J. Lobo
*Attorney, Agent, or Firm*—Timothy D. Stanley

[57] ABSTRACT

A novel method of geophysical exploration is provided whereby shot points and receiver locations are positioned such that seismic data resulting therefrom can advantageously be processed employing 3-D processing techniques to obtain a better image of the earth's subsurface structure. In one embodiment, shot points, or alternatively, receiver locations are arranged along generally sawtooth or zig zag lines so that common midpoint bins of seismic signals include a generally uniform distribution of source-receiver pair azimuths. In another embodiment, both the shot points and receiver locations are arrayed along generally alternating, sawtooth or zig zag lines.

13 Claims, 6 Drawing Sheets

Fig. 1

"PRIOR ART"

Fig. 2

• = SHOTPOINT
+ = RECEIVER LOCATION

METHODS OF GEOPHYSICAL EXPLORATION

BACKGROUND OF THE INVENTION

The present invention relates generally to geophysical exploration and more particularly to methods of acquiring and processing seismic data to obtain improved structural images of the earth's subsurface formations.

Seismic exploration techniques generally involve imparting seismic energy into the earth and recording the earth's response thereto. Typically, seismic energy can be imparted into the earth using seismic sources or explosive charges. The seismic energy refracted, reflected and scattered by the earth can be detected by seismic receivers to produce seismic signals or traces which explorationists can use to evaluate the earth's subsurface formations.

Figure 1:
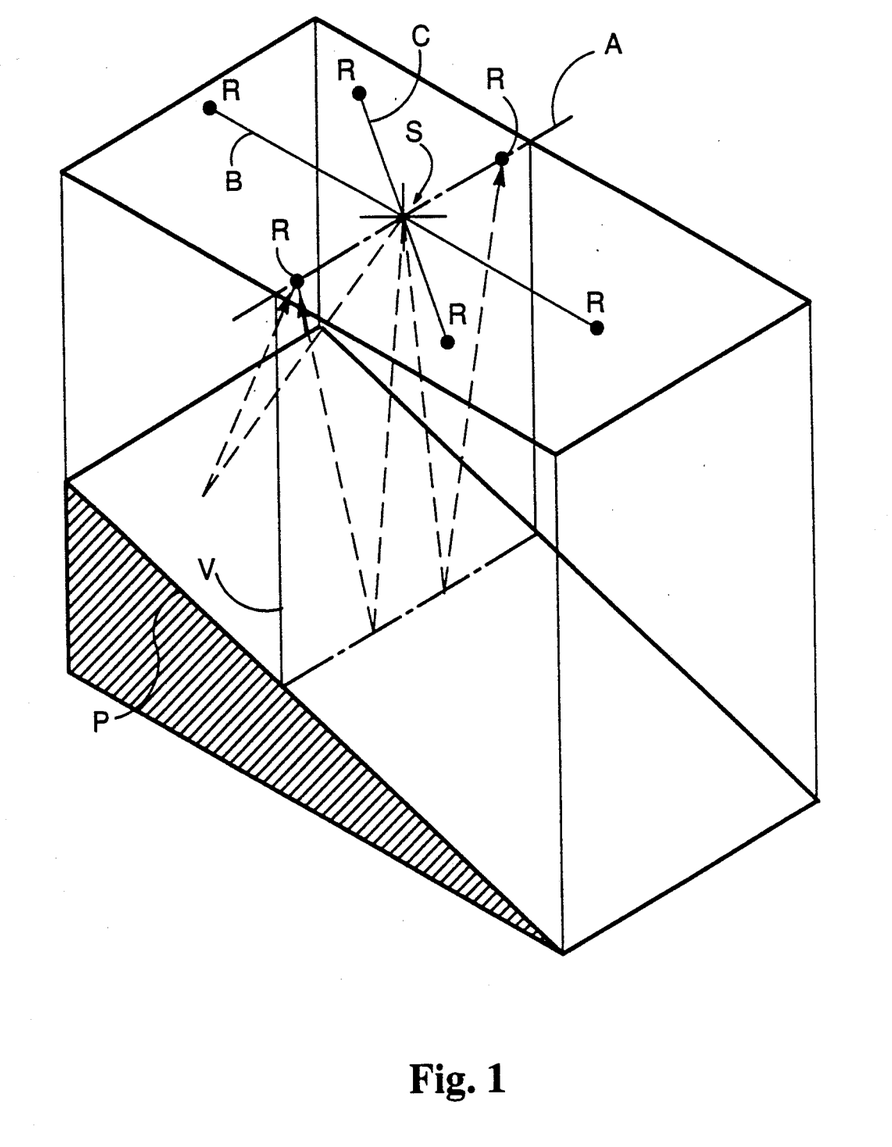
FIG. 1 is a schematic perspective view of a dipping formation in the earth.

Most seismic exploration techniques employ colinear arrays of shot points and receiver locations for imparting seismic energy into the earth and recording the earth's response thereto. Such seismic exploration techniques are conventionally referred to as two-dimensional (2-D) methods since they assume that all of the events in the recorded seismic signal come from a vertical plane defined by a seismic line of profile (A) containing the linear arrays of shot points (S) and receiver locations (R) as shown in FIG. 1. Since the earth's subsurface structure is generally not two-dimensional, but rather three-dimensional, the recorded seismic signals can contain reflection events from all directions, including those in the vertical plane defined by the seismic line of profile A. Although out-of-the-plane events can oftentimes be recognized by experienced seismic interpreters, these out-of-the-plane events can cause the seismic data to be misinterpreted.

FIG. 1 also depicts a dipping plane interface P in the earth. Line of profile A coincides with the strike direction, line of profile B coincides with the dip direction of the plane, and line of profile C is an arbitrarily oriented seismic line of profile. Conventional 2-D seismic processing of data along each line includes normal moveout correction using only estimates of seismic velocities. However, the normal moveout correction is also dependent upon the dip and azimuthal orientation of the dip for the dipping plane P. Consequently, for an arbitrarily oriented dipping surface, 2-D data and 2-D normal moveout corrections can at best only compensate for apparent dip in the inline direction, (i.e., parallel to the line of profile.) As such, an incorrect estimate of the subsurface velocities is obtained, as well as an incorrect structural image of the earth's subsurface.

A first approach to ameliorating the effect of dipping interfaces is to orient the seismic line of profile so as to coincide with the dip direction. Aligning the seismic line of profile along the dip direction can eliminate recording out-of-the-plane reflection events. However, aligning the seismic line of profile in the dip direction is not always possible because of the generally complex and varying geological structure found in certain locations. Alternatively, three-dimensional (3-D) seismic acquisition and processing techniques have been developed to overcome some of the shortcomings of the 2-D seismic acquisition techniques. Rather than employing a colinear array of shot points and receiver locations, as in the 2-D technique, 3-D seismic acquisition techniques employ areal arrays of shot points and receiver locations as described in U.S. Pat. No. 4,001,770 by Hofer and in U.S. Pat. No. 4,403,312 by Thomson. Additionally, 3-D processing techniques employing a three parameter normal moveout correction which advantageously integrates the variations of dip angle, velocity and azimuthal orientation of each source receiver pair with respect to the dip direction can be applied to 3-D seismic data to obtain better structural images of the earth's subsurface. Additional 3-D processing techniques can be employed to estimate both dip and dip azimuth of reflecting interfaces in the earth's subsurface. Because of the areal extent of 3-D seismic surveying techniques, the 3-D seismic acquisition techniques tend to be much more expensive than 2-D seismic acquisition techniques.

As a compromise between the inexpensive nature of 2-D seismic surveys and the more costly 3-D seismic surveying techniques, an alternative seismic acquisition and processing technique has evolved employing either a linear array of shot points and a limited two-dimensional array of receiver locations typically comprising several parallel, linear receiver arrays or a linear array of receiver locations and a limited two-dimensional array of source locations. Such techniques are generally referred to as wideline profiling. Exemplary of which, is the seismic exploration technique described in U.S. Pat. No. 3,838,390 by Michon. However, seismic data acquired using wideline profiling techniques are processed as conventional 2-D seismic data. Two-dimensional processing techniques are used with such wideline seismic data because the wideline profiling techniques simply do not obtain seismic signals for a broad enough range of source receiver pair azimuthal orientations to be effective with 3-D processing techniques. Moreover, wideline seismic data cannot be employed to estimate either dip or dip azimuth so as to obtain true dip corrected move-out corrections. Consequently, wideline profiling techniques can still yield seismic data which can be difficult to properly interpret in areas having complex 3-D geological features.

In order to overcome these limitations, the present invention describes a novel scheme for collecting seismic data by positioning shot points and receiver locations whereby the collected seismic data resulting therefrom provides a broad range of source-receiver pair azimuths which can effectively be processed employing 3-D processing techniques. This enables direct measurement and correction for dip and dip azimuth to be made in the normal moveout correction. These and other benefits of the present invention will be apparent from the discussion below with reference to figures in the included drawings.

SUMMARY OF THE INVENTION

Methods of geophysical exploration are described for acquiring and processing seismic data representative of three-dimensional variations in the earth's subsurface. More specifically, seismic data are collected employing a plurality of shot points and receiver locations whereby a plurality of seismic signals can be obtained for a swath of subsurface reflection points and a broad range of source-receiver pair azimuths. The seismic signals can be sorted into bins representative of a common reflection area wherein the seismic signals in each bin are obtained from a plurality of source-receiver pair azimuths of generally uniform variation. The recorded seismic data for each common reflection area comprises seismic signals obtained from a plurality of source-receiver pair azimuths effective for three dimensional seismic processing techniques, such as a three parameter moveout correction. Such 3-D processing can be applied to estimate the magnitude of and correct for variations in dip, azimuth and seismic velocity of propagation to obtain better structural images of the earth and obtain more accurate seismic velocity estimates. Additionally, such seismic data is amenable to 3-D statics processing techniques.

In one embodiment of the present invention seismic receiver locations are laid out along a zig zag or sawtooth receiver line while shot points are laid out along a generally straight line parallel to the longitudinal axis of the zig zag receiver line. Alternatively, seismic receiver locations and shot points can be reversed. In another embodiment, both the shot points and the receiver locations can be laid out along separate, alternating zig zag lines. Preferably, at least two sawtooth cycles of either shot points or receiver locations are used.

DETAILED DESCRIPTION OF THE INVENTION

In order to more completely understand the present invention, the following introductory discussion is provided. In seismic exploration, seismic energy is imparted into the earth and the earth's response thereto including reflections, refractions and direct transmissions can be recorded as seismic signals. In conventional two-dimensional (2-D) seismic acquisition techniques both shot points for imparting seismic energy into the earth and receiver locations for recording the earth's response thereto are generally arranged along colinear lines. By processing gathers of seismic signals generally reflecting from the same reflection points and correcting for normal movement, one can obtain structural images the earth's subsurface formations. However, in those instances when the earth's subsurface formations exhibit three-dimensional variations, the seismic data collected along the 2-D line of profile can include reflection events representative of reflection of the seismic energy from points not included in a vertical plane V defined by the line of profile A as depicted in FIG. 1. Consequently, interpretation of structural images in the earth's subsurface can become very difficult even to highly skilled seismic data interpreters.

Generally, the seismic signals obtained from reflecting points outside of the vertical plane are reflections from dipping formations wherein the acquisition line of profile is at an oblique angle to the strike direction of the dipping formation. Alignment of the line of profile with the dip direction can minimize such result, however a priori knowledge of the formation dip direction is not always known. Moreover, due to complex 3-D variations in the earth, such alignment of the line of profile is not always possible.

Alternatively, three-dimensional (3-D) seismic acquisition techniques have been developed using areal arrays of seismic receiver locations and shot points. Such three-dimensional acquisition techniques are much more suited to dealing with three-dimensional variations in the earth's subsurface; however; they can be very time consuming as well as extremely expensive when compared to the more conventional 2-D seismic acquisition techniques. In an effort to emulate the benefits of 3-D seismic data acquisition and yet minimize cost, a Wide Line ® profiling technique was developed as described in U.S. Pat. No. 3,838,390 by Michon. The Wide Line ® profiling technique generally employes a plurality of parallel lines of seismic receivers and a line of shot points parallel thereto or a plurality of parallel lines of shot points and a line of seismic receivers parallel thereto. The seismic data collected in the wideline techniques can then be sorted into bins representative of a common reflection area and then summed to form a stacked signal. Because of the sparseness of the source-receiver pair azimuths, the seismic data obtained with the wideline like techniques are processed using conventional 2-D processing techniques. Consequently, 2-D normal moveout corrections to the seismic data do not include corrections for the dip and dip azimuth for dipping planes. As such, 2-D normal moveout corrections can at best only compensate for apparent dip and thus obtain incorrect estimates of seismic velocity as well as erroneous images of the earth's subsurface structure.

Unlike existing 2-D or wideline like seismic acquisition techniques, the present invention describes a novel scheme for positioning shot points and receiver locations whereby seismic data resulting therefrom can advantageously be processed employing 3-D processing techniques to obtain a better image of the earth's subsurface structure, as well as improved estimates of seismic velocities and dip information on dipping formations.

Figure 2:
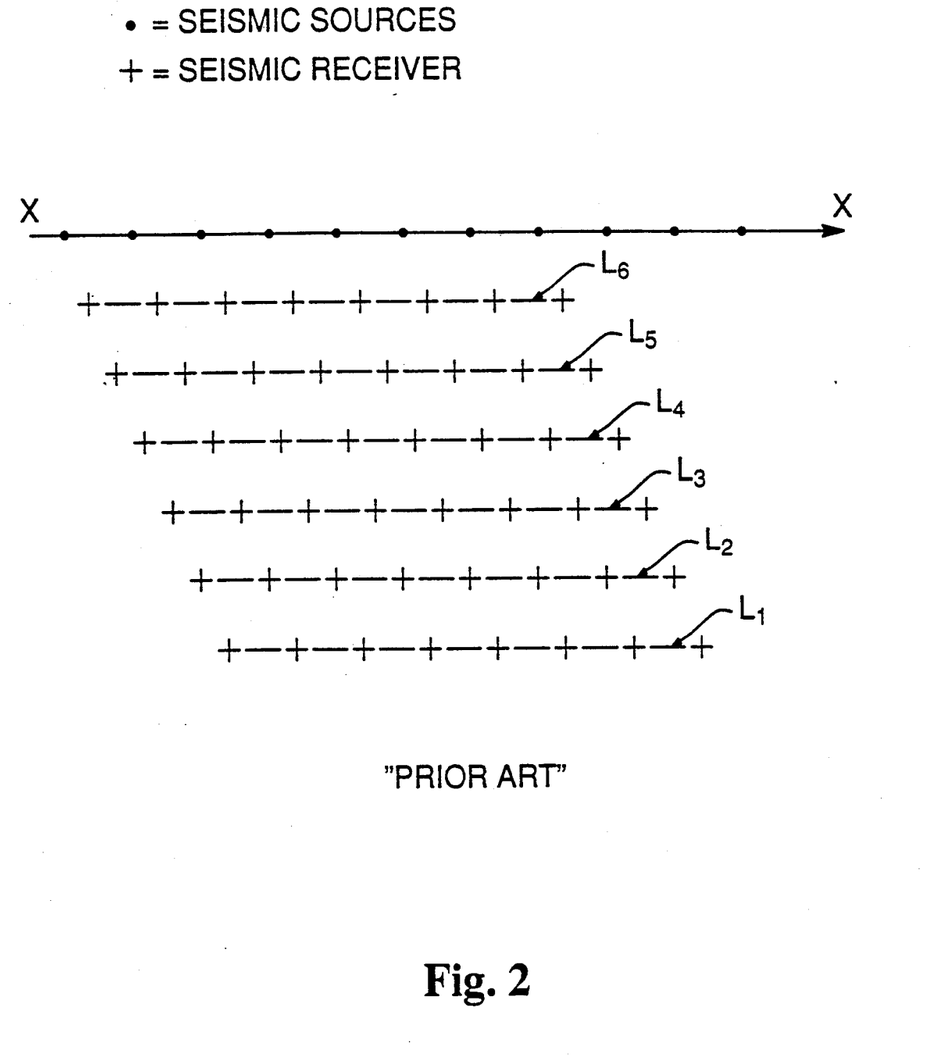
FIG. 2 is a plan view of conventional wideline acquisition.

Looking now to FIGS. 2, 3, 4 and 5, the present method of seismic acquisition will be discussed. FIG. 2 depicts conventional wideline profiling acquisition, as described by Michon, wherein a plurality of regularly spaced seismic receiver locations are positioned along parallel receiver lines $L_i$. Corresponding seismic receiver locations in adjacent receiver lines $L_i$ can be displaced one from another by an oblique angle. Additionally an adjacent line X of seismic shot points are provided which is generally parallel to the receiver lines $L_i$.

Figure 3:
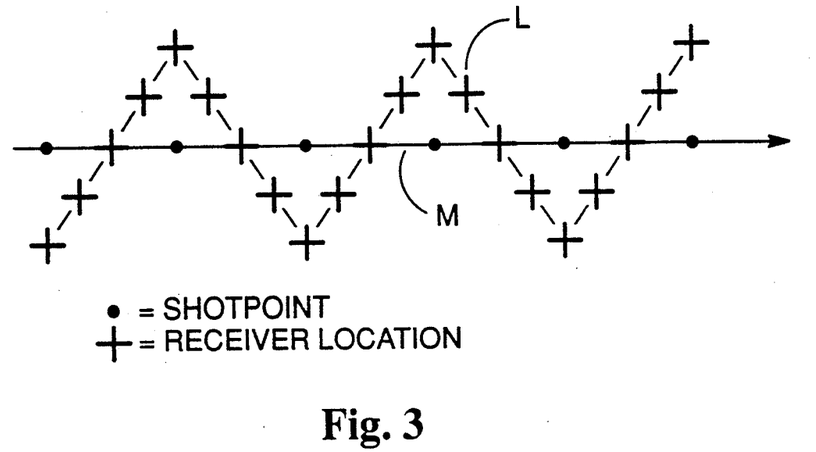
FIGS. 3, 4, and 5 are plan views of separate embodiments of the present invention for collecting seismic data.
Figure 4:
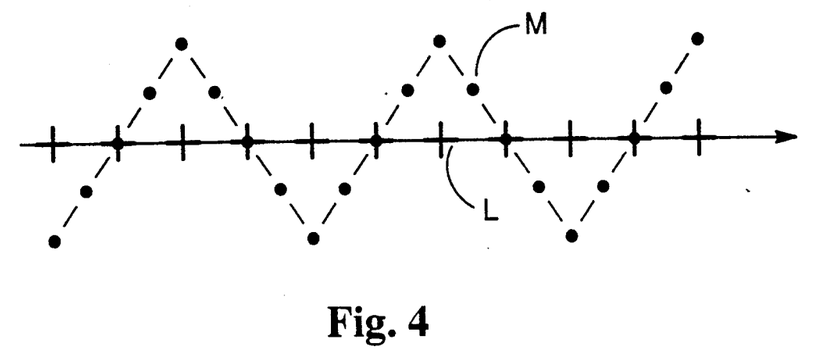
Figure 5:
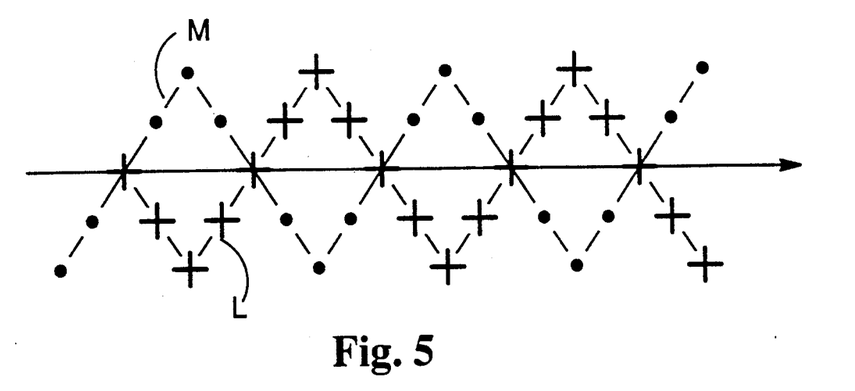

FIG. 3 depicts the present invention wherein the seismic receiver locations are positioned along a zig-zag or sawtooth line L and the shot points along a generally linear shot line M adjacent thereto and parallel to the longitudinal axis thereof. An alternative embodiment is shown in FIG. 4 wherein the shot points are positioned along a zig zag shot line M and the receiver locations are positioned on a generally linear receiver line L adjacent thereto. In FIG. 5, both the shot points and the receiver locations are positioned along separate, alternating zig-zag lines M and L, respectively.

A fundamental discovery by applicant linking the various embodiments yet distinguishing over the wideline profiling, as depicted in FIG. 2, is that each of embodiments of the present invention provides for recording seismic signals having a wide variation in source-receiver pair azimuths as well as substantially uniform distribution of source-receiver pair azimuths effective for 3-D processing techniques not provided for in either conventional 2-D or wideline acquisition techniques. An important aspect of the present invention, to ensure obtaining the desired wide variations in source-receiver pair azimuths, is that the seismic signals collected in each common midpoint bin comprise seismic signals obtained with at least two cycles of the sawtooth or zig zag line.

Figure 6:
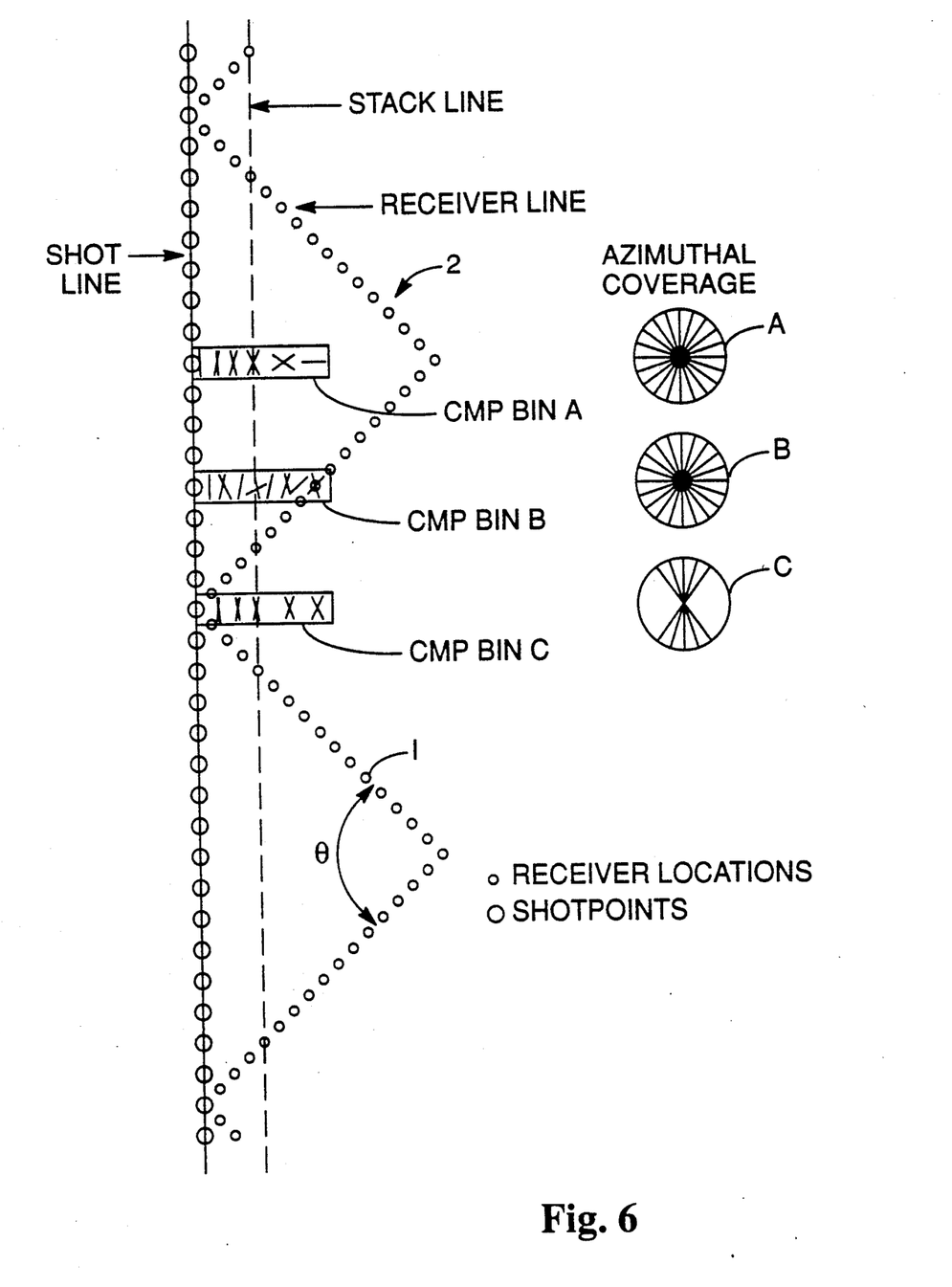
FIG. 6 is a plan view of one embodiment of the invention depicting selected CMP bins and the associated source-receiver pair azimuthal coverage for each CMP bin.

FIG. 6 demonstrates the broad range of source-receiver pair azimuths obtained in common midpoint (CMP) bins of seismic signals using the present method when the receivers are positioned along at least two cycles of the zig zag line (labeled 1 and 2) to achieve a broad range of azimuths. The seismic data were obtained employing a zig-zag receiver line and adjacent linear shot line. The angle $\theta$ is preferably a right angle. However, those skilled in the art will now appreciate from this application that to achieve the desired result of seismic signals having a broad range of source-receiver pair azimuths, other angles $\theta$, especially acute angles, can also be employed. The seismic signals recorded with the present invention can be sorted into bins generally representative of common midpoint reflection areas. In particular, three CMP bins A, B and C are shown schematically along with three corresponding inserts depicting the source-receiver pair azimuthal coverage for each CMP bin. The inserts demonstrate that only at points where the shot and receiver lines are very close is full azimuthal source-receiver pair coverage not obtained.

Figure 7:
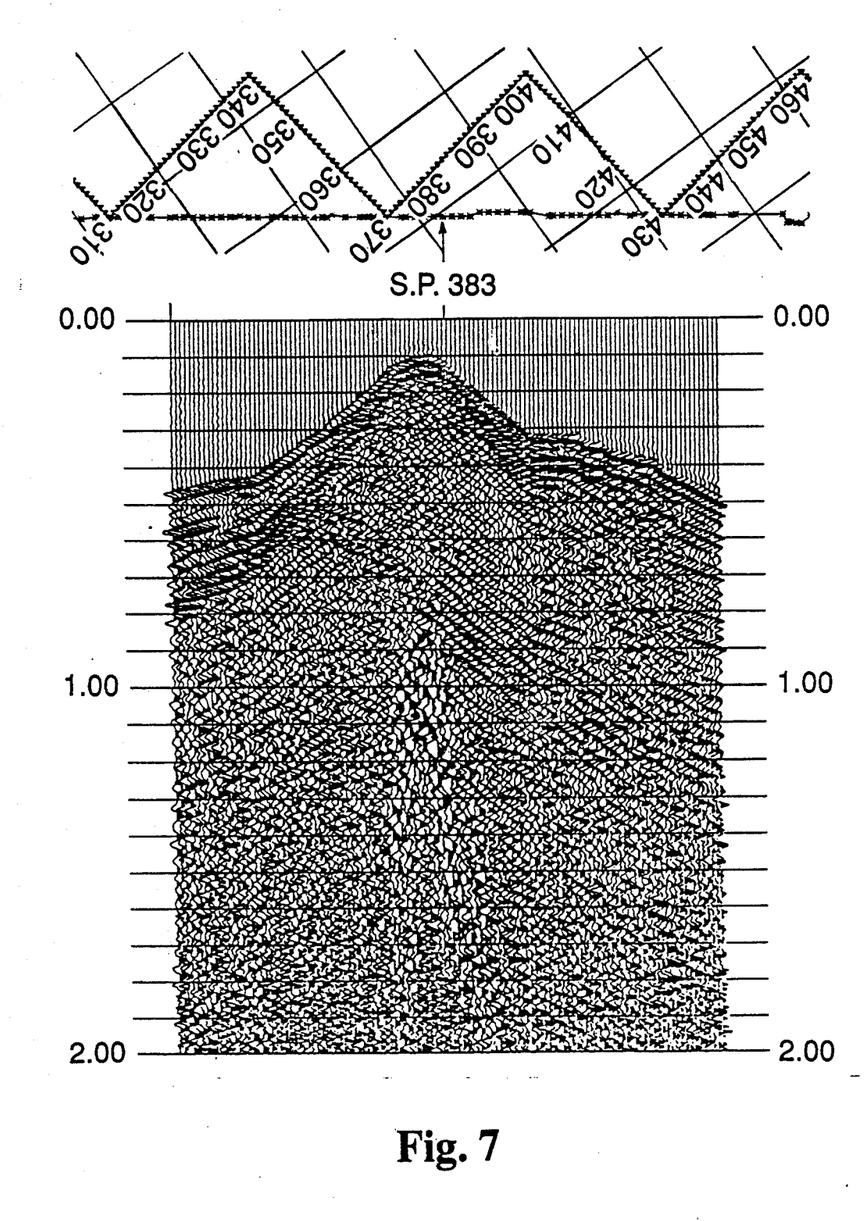
FIG. 7 is a common shot point record of seismic data collected at shot point (SP383) of the plan view of the recording layout shown.

FIG. 7 is a seismic section representative of the seismic signals recorded from seismic energy imparted into the earth at shot point 383 in the plan view of a zig zag acquisition scheme also depicted therein. The change of slope of reflection and refraction events corresponds to a change in direction of the receiver line while the severe offset of the reflection hyperbola denotes a very high dip angle in the subsurface formations. The very high dips depicted in FIG. 7 are the result of a folded anticline formation depicted near the center of the displayed seismic data.

Figure 8A:
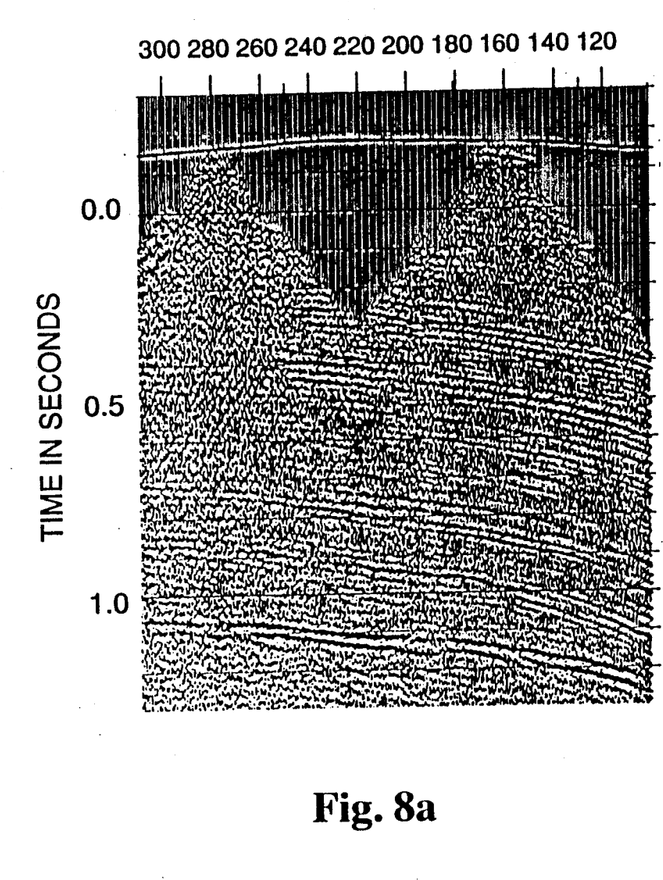
FIGS. 8a and 8b are separate sets of seismic data collected using one embodiment of the invention with the data in FIG. 8a having been processed using 3-D techniques and the data in FIG. 8b having been processed using 2-D techniques.
Figure 8B:
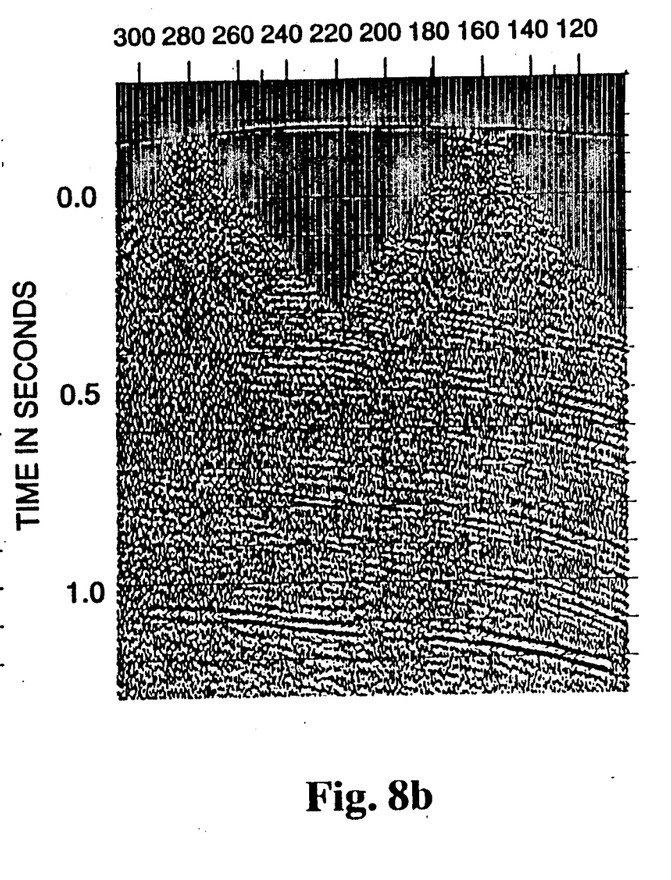

FIGS. 8a and 8b are representative of seismic data collected using the layout scheme of FIG. 5. However, FIG. 8a shows the seismic data after 3-D processing employing both three parameter moveout correction as well as 3-D statics and FIG. 8b shows the seismic data after 2-D processing employing one parameter moveout correction as well as 2-D statics. FIG. 8a clearly provides better definition of the structural image of the earth's subsurface formations than FIG. 8b. Moreover, if either 2-D or conventional wideline profile acquisition techniques had been used in combination with 2-D processing, the resulting structural images of the earth's subsurface formations would have been even poorer than that depicted in FIG. 8b.

The present method thus describes a technique for obtaining wide line-like seismic data but which is amenable to 3D processing techniques. In summary, the present invention consists of separating the receiver line from the source line to record a full range of source receiver pair azimuths. The data can then be input into a three parameter velocity analysis and three dimensional residual statics processing. The benefits of this approach are improved estimates of the dip and dip azimuth as well as corrected velocity field and true dip and dip azimuth information for all reflectors. It is also cost effective in that it takes very little extra effort to record compared with a conventional 2-D technique and its logistical simplicity renders it much cheaper than the wideline technique. As such, the wide line like seismic data collected in accordance with the the present invention can be processed using the more powerful three parameter moveout techniques employed with seismic data collected employing the areal techniques of conventional 3-D acquisition.

It is to be appreciated that additions and modifications may be made to the instant embodiments of the inventions without departing from the invention which is defined in the following claims.

We claim:

1. A method of seismic exploration, comprising the steps of:
    (a) imparting seismic energy into the earth's subsurface at selected intervals along a generally linear shot line;
    (b) recording a plurality of seismic signals representative of the earth's response thereto at selected intervals along a generally zigzag receiver line for a plurality of source-receiver pair azimuths;
    (c) sorting the seismic signals into common mid-point (CMP) bins to obtain CMP bins of seismic signals having a plurality of source-receiver azimuths effective for three-dimensional (3-D) processing; and
    (d) 3-D moveout correcting the seismic signals in each CMP bin employing a three parameter moveout correction, wherein the three parameters include velocity, dip, and the azimuthal orientation of dip.

2. The method of claim 1, further including the step of:
    (a) sorting the seismic signals into common midpoint (CMP) bins; and
    (b) moveout correcting the seismic signals in each CMP bin employing three parameter moveout correction, wherein the three parameters include velocity, dip, and the azimuthal orientation of dip.

3. The method of claim 1, wherein the CMP bin of recorded seismic signals are effective for obtaining estimates of dip and dip azimuth for dipping formations.

4. The method of claim 1 wherein the seismic signals in each CMP bin are obtained from at least two zigzag cycles of receivers.

5. A method of seismic exploration, comprising the steps of:
    (a) imparting seismic energy into the earth's subsurface at selected intervals along a generally zigzag shot line;
    (b) recording a plurality of seismic signals representative of the earth's response thereto at selected intervals along a generally linear receiver line for a plurality of source-receiver pair azimuths;
    (c) sorting the seismic signals into common mid-point (CMP) bins to obtain CMP bins of seismic signals having a plurality of source-receiver azimuths effective for three-dimensional (3-D) processing; and
    (d) 3-D moveout correcting the seismic signals in each CMP bin employing a three parameter moveout correction, wherein the three parameters include velocity, dip and azimuthal orientation of dip.

6. The method of claim 5, further including the step of:
   (a.) sorting the seismic signals into common midpoint (CMP) bins; and
   (b.) moveout correcting the seismic signals in each CMP bin employing three parameter moveout correction, wherein three parameters include velocity, dip and azimuth orientation of dip.

7. The method of claim 5 wherein the seismic signals in each CMP bin are obtained from at least two zigzag cycles of the shot line.

8. A method of seismic exploration, comprising the steps of:
   (a) imparting seismic energy into the earth's subsurface at selected intervals along a generally zigzag shot line;
   (b) recording a plurality of seismic signals representative of the earth's response thereto along a generally zigzag receiver line for a plurality of source-receiver pair azimuths;
   (c) sorting the seismic signals into common mid-point (CMP) bins to obtain CMP bins of seismic signals having a plurality of source-receiver azimuths effective for three-dimensional (3-D) processing; and
   (d) 3-D moveout correcting the seismic signals in each CMP bin employing a three parameter moveout correction, wherein the three parameters include velocity, dip, and the azimuthal orientation of dip.

9. The method of claim 8, further including the steps of:
   (a.) sorting the seismic signals into common midpoint (CMP) bins; and
   (b.) moveout correcting the seismic signals in each CMP bin employing three parameter moveout correction, wherein the three parameters include velocity, dip, and the azimuthal orientation of dip.

10. The method of claim 8 wherein seismic signals in CMP bins are obtained from at least two zigzag cycles of the receiver line.

11. The method of claim 8 or 10 wherein the seismic signal in each CMP bin are obtained from at least two zigzag cycles of the shot line.

12. The method of claim 8 wherein the shot line and receiver line comprise alternating zigzag lines.

13. The method of claim 8 including the step of processing the recorded signals and obtaining estimates of dip and dip azimuth for dipping formations in the earth's subsurface.

* * * * *